E. J. VON HENKE.
ELECTRIC METAL WORKING MACHINE.
APPLICATION FILED OCT. 28, 1918.
1,304,634.  Patented May 27, 1919.
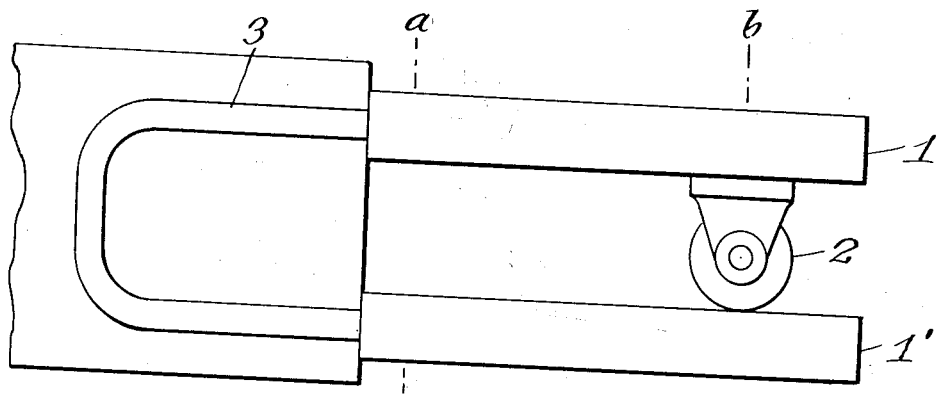
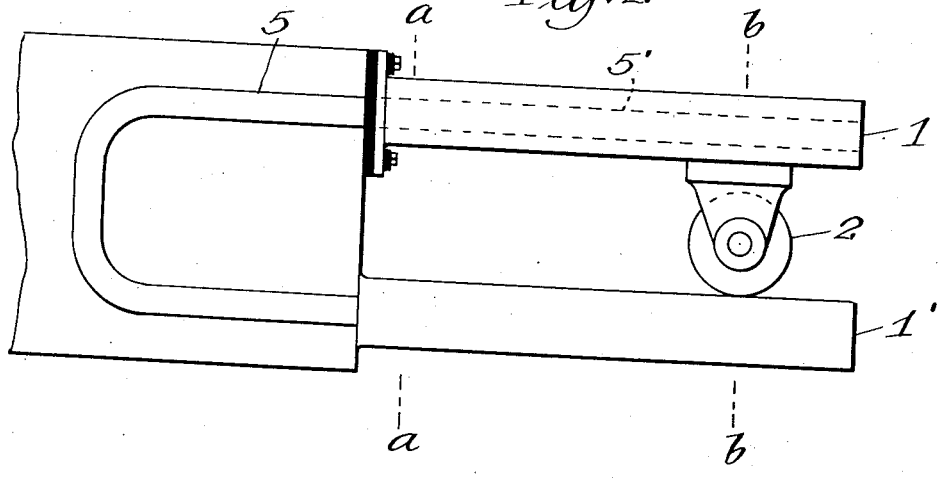
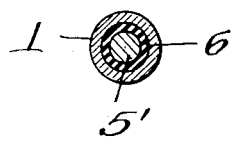
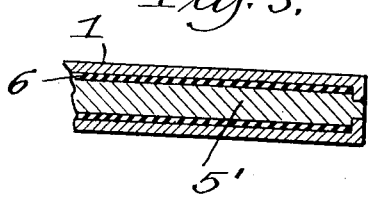
INVENTOR
Edmund J. Von Henke
BY
Townsend & Decker
ATTORNEYS

UNITED STATES PATENT OFFICE.

EDMUND JANNEZ von HENKE, OF NEW YORK, N. Y., ASSIGNOR TO THOMSON ELECTRIC WELDING COMPANY, OF LYNN, MASSACHUSETTS, A CORPORATION OF MASSACHUSETTS.

ELECTRIC METAL-WORKING MACHINE.

1,304,634.   Specification of Letters Patent.   Patented May 27, 1919.

Application filed October 28, 1918. Serial No. 259,914.

*To all whom it may concern:*

Be it known that I, EDMUND J. VON HENKE, a citizen of the United States, and a resident of New York, in the county of New York and State of New York, have invented certain new and useful Improvements in Electric Metal-Working Machines, of which the following is a specification.

My invention relates to that class of machines designed for electric welding or similar operations employing a current of electricity passed through the work as the heating agent, wherein the machine is constructed with a pair of conducting horns or arms extending in the same direction and parallel to one another from a suitable support to which they are rigidly secured and forming between them a work gap or throat for the introduction of the work to be heated by the passage of the current from one horn or arm to the other.

This construction of machine is frequently employed for electric seam welders and is sometimes used for welding work such as sheet metal at a number of spots or points in a line.

The object of my present invention is to secure uniformity of heating current at all points in the space between said horns or arms by a simple modification of the construction of such class of machines and without employing a boosting transformer, reactances or other appliances for regulating the voltage to secure uniformity of such heating current.

In the present specification I have described my invention as applied to seam welding machines but from such description the manner of applying it to machines designed for other electric metal working operations will be obvious to those skilled in the art.

In the accompanying drawings:

Figure 1 is a side elevation of a construction of seam welding machine upon which my present invention is designed as an improvement.

Fig. 2 shows in side elevation a form of machine constructed in accordance with my invention.

Fig. 3 is a longitudinal cross-section through one of the horns or arms modified in construction in accordance with my invention.

Fig. 4 is a cross-section through said arm.

Referring to the drawings, Fig. 1, the parallel arms or horns indicated by the numerals 11' are rigid arms extending parallel with one another from a suitable support and forming respectively the opposite electrodes of the machine. When used in a seam welding machine a suitable roller electrode 2 adapted to slide on have continuous connection with the arm 1 will be employed. The opposite arm or horn 1' would form a seat or electrode carrying the work. At the point of support said arms may, for convenience, be constructed as integral extensions of the secondary 3 of a suitable transformer or, as well understood, they may be attached or carried by any other suitable rigid support and have current fed to them from said secondary by suitable connections.

As will be apparent, when the electrode 2 is in the position indicated by the dotted line *a—a* the length of secondary circuit is much shorter than when said electrode is in the position indicated by the dotted line *b—b* and the length of such circuit will vary continuously as the electrode takes different positions in the space between said horns or arms. This difference in length of secondary circuit is a frequent source of trouble particularly with long horn welders or machines since, owing to the difference in length of the secondary circuit, the strength of the current due to varying resistances and other effects will vary. If the secondary voltage which is usually held constant and proportionate to the ratio of transformation is of proper strength to produce the desired heating effect in position *a*, it will be unsuited for position *b* and in seam welding the effect would be that the proper weld would not be produced in position *b*. If the voltage be made proper for welding in position *b* then it will be too great for position *a* with the result of burning the stock. Various plans have been proposed to overcome this difficutly but the devices suggested are necessarily cumbersome and hard to adjust so as to give uniform results. Other plans heretofore proposed call for an unnecessary amount of copper and a departure from the general plan of construction above described, which is frequently undesirable in practice.

In order to overcome these difficulties and secure a simple and compact construction of machine I propose to construct the same in the manner indicated in Fig. 2. In this instance one horn or arm of the machine, as for instance arm 1, instead of being in electrical connection at or near its point of support with the secondary terminal or other source of current, is insulated at such point of attachment or support as indicated at 3 and the connection from the secondary proper or other source 5 is made by the conducting extension 5' insulated from said arm 1 at and near its point of support; but connected thereto at its end remote from the support, as indicated by the dotted lines. This connection 5' is preferably carried along parallel with and supported by said arm 1. The best construction is one in which it is carried inside the arm, since it is thereby better protected from injury or displacement. As will be understood, suitable insulation is provided except at the point of attachment at the remote end.

As will be apparent, with this arrangement the heating current employed in position $b$ will be the same as in position $a$ and will be uniform at all intermediate positions since, in all positions the length of the secondary circuit will remain the same and although the secondary circuit is at all times a trifle longer than in the old arrangement, yet it never varies in length and by providing a little higher voltage a constant strength of welding or heating current is obtained while at the same time the substantial structural characteristics of the old form of machine are preserved.

Obviously, instead of applying the modified construction to the arm 1 it might be applied to the arm 1'. A desirable way of constructing the arm thus modified is illustrated in the Figs. 3 and 4 in which the connection 5' is indicated as a solid bar in suitable direct connection with the terminal of the secondary 5 and insulated from the conducting arm 1 by interposed insulation 6, excepting at the end remote from the point of attachment where, as shown in the Fig. 4, said bar 5' is in direct electrical connection with the remote end of said bar 1'.

As will be obvious, the center portion 5' of the horn or arm could be made of steel, which would give considerable strength to the horn, which would be particularly desirable in the case of the lower horn or arm of a seam welder where the work is supported by said arm. The outside of the arm would form a sleeve and electrode and be preferably made of hard drawn copper of suitable thickness.

What I claim as my invention is:

1. An electric metal working apparatus having a pair of rigid conducting arms extending in the same direction parallel to one another from a suitable support and affording a work gap or throat between them, one of said arms being directly connected with a source of heating current at or near the point of support and the other being connected with the opposite pole or terminal of said source by connection insulated therefrom at the point of support and in electrical connection therewith at the remote end thereof.

2. In an electric metal working apparatus of the character described, a rigid conducting arm insulated from its support at the end thereof next the source and having an insulated connection from said source parallel with the arm and connected to the remote end thereof.

3. In an electric seam welder having a pair of rigid arms extending in the same direction parallel with one another from a suitable support to form a work space or gap, the combination with said arms of a source of heating current in direct electrical connection as to one terminal with the end of one arm at or near its point of support and as to the other terminal electrically connected with the remote end of the other arm and insulated therefrom at the point of attachment of said arm to its support and throughout its length.

4. In an electric metal working apparatus of the character described, a conducting arm or horn comprising concentric conducting members insulated from one another except at their ends remote from the source and there electrically united.

5. In an electric welding machine of the character described, a conducting arm or horn consisting of a conducting exterior and a steel core connected to the source and insulated from said arm excepting at the end thereof remote from the point of support of the arm.

Signed at New York, in the county of New York and State of New York, this 26th day of October, A. D. 1918.

EDMUND JANNEZ von HENKE.

Witnesses:
W. R. WARNER,
C. F. TISCHNER.